United States Patent [19]

Wilsch et al.

[11] 3,744,889

[45] July 10, 1973

[54] MOTION PICTURE PROJECTOR FOR USE WITH PLURAL TYPES OF FILM-CONTAINING MAGAZINE

[76] Inventors: Herbert Wilsch; Johann Zanner, Jr., both of Unterhaching, Germany

[22] Filed: Feb. 23, 1972

[21] Appl. No.: 228,656

[30] Foreign Application Priority Data
Feb. 27, 1971 Germany.................... P 21 09 465.5

[52] U.S. Cl.................................. 352/72, 242/197
[51] Int. Cl. .......................................... G03b 23/02
[58] Field of Search ................ 352/72, 73; 242/197, 242/180, 181

[56] References Cited
UNITED STATES PATENTS
3,656,703    4/1972    Vockenhuber ..................... 242/197

*Primary Examiner*—J. D. Miller
*Assistant Examiner*—Harvey Fendelman
*Attorney*—Michael S. Striker

[57] ABSTRACT

The housing of a motion picture projector has a platform which is movable between first and second positions to thereby respectively support from below magazines of a first type with floating reels and magazines of a second type with centered reels. The housing further supports a spindle which is movable to a first position to thereby center the reel of a magazine of the first type in the operative position of such magazine, and to a second position in which it is out of the way of a magazine of the second type when such magazine dwells in its operative position. The housing also supports stationary and movable engaging elements which can engage complementary elements on the magazines to locate and/or hold such magazines in their operative positions. A displacing lever can move the platform and the spindle, as well as the movable enegaging elements, so that the engaging elements for magazines of the second type are out of the way when the platform can support a magazine of the first type, and vice versa. The displacing lever can also move a friction wheel which serves to rotate the reels in magazines of the second type.

13 Claims, 1 Drawing Figure

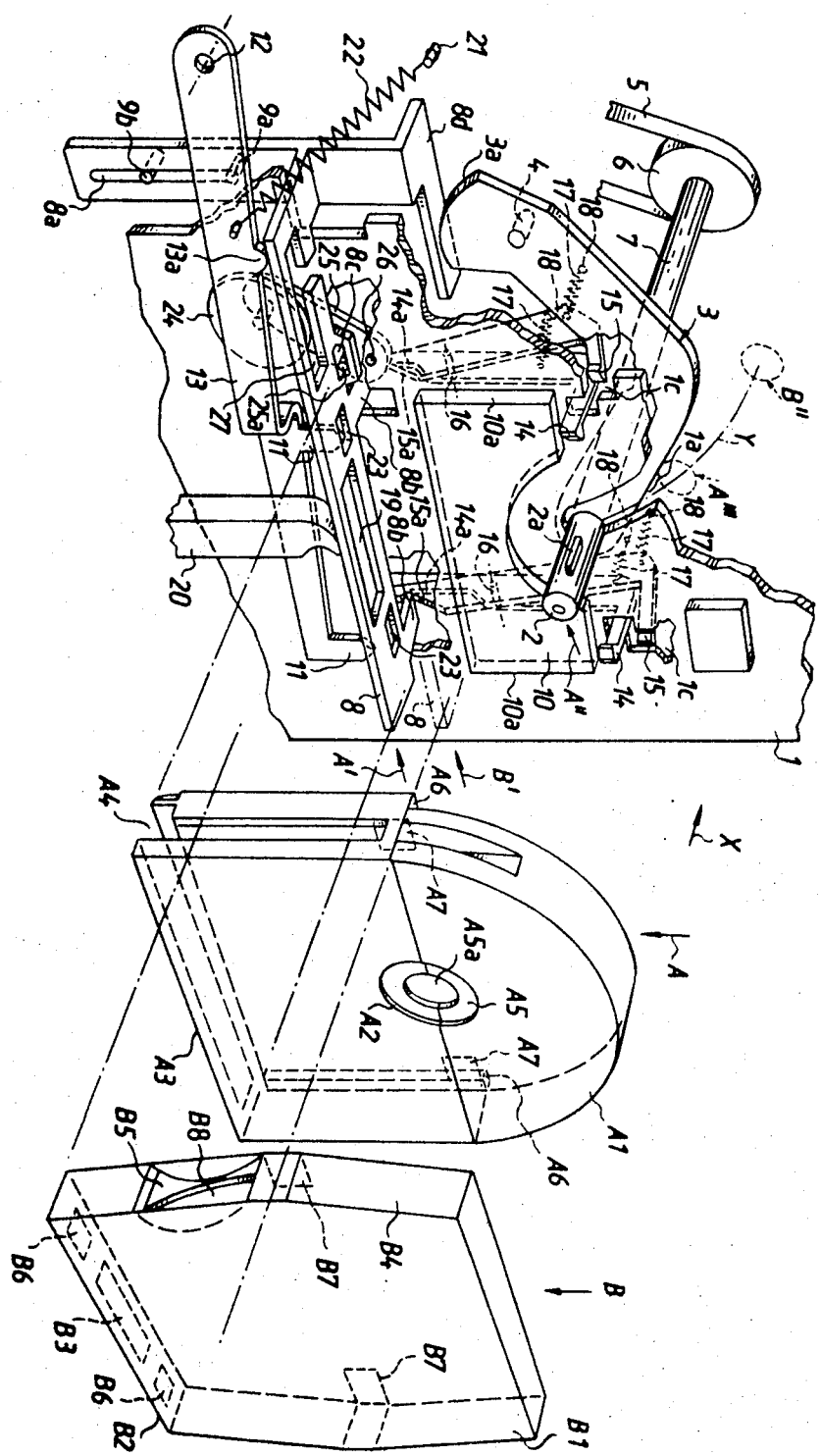

MOTION PICTURE PROJECTOR FOR USE WITH PLURAL TYPES OF FILM-CONTAINING MAGAZINE

BACKGROUND OF THE INVENTION

The present invention relates to improvements in cinematographic apparatus in general, and more particularly to improvements in motion picture projectors. Still more particularly, the invention relates to improvements in motion picture projectors which can be utilized with plural types of film-containing cassettes or analogous film magazines.

Certain types of film-containing magazines employ so-called floating or uncentered reels which must be centered when the magazine is properly mounted in or on the housing of the motion picture projector. Certain other types of film-containing magazines employ centered reels which need not be supported by a spindle or the like when the magazine is properly mounted in or on the housing of the projector. If a motion picture projector is designed to use different types of magazines, it is desirable to select the operative positions of different magazine types in such a way that such positions overlap, at least in part. This is necessary and desirable in order to insure that various auxiliary components of the projector can be used in connection with magazines of different types. For example, it is highly desirable to mount the relatively complex film threading mechanism which serves to withdraw film from an inserted magazine in such a way that the threading mechanism can be used for the withdrawal of film from magazines with floating or centered reels. The threading mechanism introduces the leader of the withdrawn film into a film path along which the leader is advanced toward and is thereupon connected to the core of a takeup reel.

SUMMARY OF THE INVENTION

An object of the invention is to provide a novel and improved motion picture projector which can be used with plural types of film-containing magazines and which can insure accurate and reproducible mounting of each magazine type.

Another object of the invention is to provide the motion picture projector with novel and improved engaging means which can properly locate and/or hold different types of magazines in requisite positions for withdrawal of film from their interior.

A further object of the invention is to provide a motion picture projector wherein a particular magazine type can be placed to its operative position only when the parts or components which are not used in connection with such magazine type are moved away from their normal operative positions.

An additional object of the invention is to provide a motion picture projector wherein a first magazine type can be removed and replaced with a magazine of a second type with little loss in time.

Still another object of the invention is to provide a motion picture projector which can accept several types of film-containing magazines as well as a plurality of differently dimensioned magazines of each type.

The invention is embodied in a cinematographic apparatus for use with at least one first type of film magazines with uncentered reels and at least one second type of film magazines with centered reels, particularly in a motion picture projector. The apparatus comprises a housing and a rotary spindle which is movable to at least one first position wherein it centers the reel of a magazine of the first type when such magazine is maintained in a first predetermined operative position relative to the housing. The spindle is further movable to a least one second position in which it allows the placing of a magazine of the second type to a second predetermined operative position relative to the housing.

The apparatus further preferably comprises displacing means which may assume the form of a lever and is supported by the housing. The displacing means is movable with reference to the housing to thereby move the spindle between its first and second positions. The operative position of a magazine of the first type preferably at least partially coincides with the operative position of a magazine of the second type, and the spindle is located without the region of coincidence between the first and second operative positions when the spindle assumes its second position.

The apparatus further comprises drive means which is supported by the housing and is movable to and from a driving position in which the drive means can rotate the reel of at least one of the magazine types in the operative position of such magazine. The apparatus also comprises means for moving the drive means to such driving position in response to movement of the spindle to that position in which the spindle permits the placing of the magazine of the one type to its operative position. In accordance with another feature of the invention, the apparatus further comprises first and second engaging means. At least a portion of each such engaging means is respectively movable to and from an engaging position in response to movement of the spindle to its first and second positions. Each magazine of the first type has first complementary engaging means cooperating with the first engaging means of the apparatus in the operative position of such magazine and in the first position of the spindle to locate and/or hold the magazine in the first operative position. Each magazine of the second type has second complementary engaging means which cooperate with the second engaging means of the apparatus in the operative position of such magazine and in the second position of the spindle to locate and/or hold the magazine in the second operative position.

The novel features which are considered as characteristic of the invention are set forth in particular in the appended claims. The improved motion picture projector itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a fragmentary perspective view of a motion picture projector which embodies the invention, further showing a magazine of the first type and a magazine of the second type.

DESCRIPTION OF THE PREFERRED EMBODIMENTS

The improved motion picture projector comprises a housing which includes a wall 1. The projector can be used with two types of film-containing magazines or cassettes, namely, with magazines of the type having floating or uncentered film-collecting reels and with magazines with centered film-collecting reels. A magazine A with an uncentered or floating reel A5 is shown in front of the housing wall 1 in an orientation parallel to that in which the magazine A dwells in its operative position relative to the projector housing. The magazine A further comprises a preferably plastic casing A1 which confines the reel A5 and is provided with two registering circular openings A2 (only one can be seen) which expose the core of the reel A5 and the central aperture A5a of the core. The bottom panel A3 of the magazine A has a narrow exposed face provided with an elongated slot A4 through which the motion picture film can be withdrawn from the casing A1 to be introduced into the film path defined by the projector for transport toward the takeup reel, not shown. The casing A1 comprises a substantially rectangular lower portion and a substantially semicircular upper portion. When the magazine A dwells in its operative position relative to the wall 1 of the housing of the motion picture projector, the central aperture A5a of the core forming part of the floating reel A5 receives a rotary spindle 2 which is movably mounted in the housing of the projector. The spindle 2 has a motion transmitting projection 2a which can enter a matching recess in the core of the reel A5 so that the reel A5 can be rotated by the spindle 2 in at least one direction, namely, in a direction to collect the film on the reel A5. The drive means for rotating the spindle 2 in such direction comprises a shaft 7 which is coaxial with the spindle, a pulley 6 which is fixed to the shaft 7 and an endless belt 5 which is driven by a second pulley, not shown, receiving motion from the projector motor. The direction in which the magazine A should be moved in order to introduce the spindle 2 into the aperture A5a is indicated by the arrow X.

The magazine B of the second type comprises a preferably plastic casing B1 which substantially confines a centered reel B8. The casing B1 is substantially symmetrical with reference to the axis of rotation of the reel B8. The narrow bottom wall B2 of the casing B1 is provided with an elongated substantially centrally located slot B3 through which the film can be withdrawn for introduction into the aforementioned film path defined by the motion picture projector. A side wall B4 of the magazine casing B1 is provided with a window B5 which affords access to one or both flanges of the reel B8 and/or to the roll of convoluted film on the core between such flanges. The purpose of the window B5 is to enable a drive means of the projector to enter the casing B1 so as to rotate the reel B8 in a direction to collect the film subsequent to transport of the film frames past the projection gate and/or to cause the reel B8 to rotate in a to expel the leader of motion picture film through the slot B3 in the bottom wall B2 of the casing B1. The just mentioned drive means for the reel B8 includes a friction wheel 24 which is shown in the lower left-hand portion of the drawing.

The wall 1 of the projector housing is provided with an arcuate slot 1a wherein the spindle 2 is movable between a plurality of positions including a first end position A'' and a second end position B''. The spindle 2 is mounted on is merely movable by a displacing lever 3 which is pivotable in the housing of the motion picture projector, as at 4, and performs several additional functions.

The projector further comprises a plurality of stationary and movable engaging members or elements which serve to properly locate and/or hold or lock the selected magazine A or B in its operative position relative to the wall 1. The arrangement is such that the engaging means which serve to properly locate and/or hold the magazine A can be retracted or withdrawn. When the user whishes to place the magazine B to the operative position, and that the engaging means for the magazine B can be retracted or withdrawn when the user wishes to place the magazine A to its operative position. The two engaging means comprise a common engaging member in the form of a platform 8 which is movable between a first position A' which is indicated by solid lines and a second or raised position B' which is indicated by phantom lines. The platform 8 is movable between the positions A' and B' relative to the housing of the motion picture projector and is provided with an elongated vertical slot 8a for reception of stationary guide pins 9a, 9b.

The engaging means for the magazine A further comprises a plate-like stationary engaging member 10 which is mounted at the front side of the wall 1 and has vertically extending marginal portions 10a which can cooperate with elongated vertical strips A6 of the magazine A when the latter dwells in its operative position. The movable engaging means for the cassette or magazine A comprises a pair of claws 14 which can be received in complementary engaging means in the form of sockets or recesses A7 provided in the casing A1.

The movable engaging means for the magazine B comprises two projections or teeth 11 which are provided on a carrier 13 pivotably mounted in the housing of the motion picture projector, as at 12. The carrier 13 be pivoted from the illustrated retracted or idle position to a or operative position whereby the projections 11 extend through and beyond openings 23 provided therefor in the platform 8. The projections 11 then extend into complementary engaging means in the form of sockets B6 provided in the narrow bottom wall B2 of the casing B1 when the magazine B dwells in its operative position adjacent to the wall 1 of the housing of the motion picture projector. The movable engaging means for the casing B1 of the magazine B further comprises a pair of claws 15 which are movably mounted in the housing of the projector and can be received in complementary engaging means in the form of recesses B7 provided in one major panel of the casing B1. The claws 14 or 15 extend forwardly through slots 1c provided therefor in the wall 1. The claws 14 and 15 are pivotable in the housing about the axes of shafts 16 and are biased by helical springs 17 each of which is attached to a stationary post 18 of the housing. The arrangement is such that the claws 14 are automatically extended beyond the wall 1 when the projector is ready to receive and retain a magazine A, and that the claws 15 are automatically extended beyond the wall 1 when the projector is ready to receive and retain a magazine B.

The central portion of the platform 8 is provided with an elongated slot 19 through which the film can be transported when the magazine A or B dwells in its operative position. Thus, the slot 19 registers with the slot A4 when the magazine A is adjacent to the exposed side of the wall 1, and the slot 19 registeres with the slot B3 when the magazine B is held and located in its operative position. The exact details of the mechanism which can withdraw the leader of motion picture film from a magazine A or B form no part of the present invention. The drawing merely shows a deflector 20 which can be introduced through the slot 19 of the platform 8 and through the slot A4 or B3 so as to engage the outermost convolution of film on the reel A5 or B8 while the respective reel rotates in a direction to pay out the film. This causes the leader of motion picture film to enter the aforementioned film path and to advance toward the core of the takeup reel in the housing of the motion picture projector.

The operation is as follows

The drawing illustrates the parts of the motion picture projector in positions they assume when the projector is ready to receive, locate and hold a magazine A of the first type. Thus, the spindle 2 dwells in its first end position A'' so that, when the magazine A is moved sideways in the direction indicated by the arrow X, the spindle penetrates through the aperture A5a of the uncentered or floating reel A5 and its motion transmitting projection 2a enters a slot or notch of the core so as to be in proper motion transmitting or driving engagement with the reel A5. The platform 8 dwells in its lower position A' in which it can support from below the narrow bottom panel A3 of the casing A1. The claws 15 are retracted behind the respective slots 1c but the claws 14 extend through such slots and beyond the exposed side of the wall 1 so that they can snap into the recesses A7 of the casing A1 when the latter is advanced to a position in which the strips A6 engage the marginal portions 10a of the stationary engaging member 10 on the wall 1. It will be noted that, when the magazine A dwells in its operative position, the casing A1 is located and oriented as well as held by stationary engaging means including the member 10 and by movable engaging means including the platform 8 and the two claws 14. This insures that the slot A4 of the casing A1 is in proper register with the slot 19 of the platform 8 so that, when the deflector 20 is lifted in order to move its tip into engagement with the outermost convolution of film on the core of the reel A5, and the reel A5 is rotated in a direction to pay out the film, the leader of the film will automatically advance into the aforementioned film path.

In order to permit movement of the magazine B to the operative position relative to the wall 1, the user of the projector must pivot the displacing lever 3 in a counterclockwise direction, as viewed in the drawing, so that the axis of the spindle 2 travels along an arcuate path indicated by a phantom line Y. The spindle 2 comes to rest in the end position B'' in which it is out of the way of the casing B1. The position B'' of the spindle 2 is selected in such a way that the spindle is then located without the region of coincidence between the operative positions of the casings A1 and B1. The carrier 13 is biased by a helical spring 22 which is attached to a post 21 in the housing of the motion picture projector. This carrier has a projection or lobe 13a which bears against the underside of the platform 8 and tends to move the platform to the position B'. The platform 8 has an upwardly extending arm 8d which abuts against a convex cam face 3a of the displacing lever 3. When the displacing lever 3 has been pivoted to a position in which the spindle 2 assumes the end position B'', its cam face 3a allows the arm 8d, and hence the entire platform 8, to rise to the position B'. In such position, the platform 8 can properly support the narrow bottom wall B2 of the magazine B. The lobe 13a of the carrier 13 follows the upward movement of the platform 8 and its teeth 11 extend through the openings 23 so as to enter the sockets B6 in the bottom wall B2 provided that the casing B1 dwells in its operative position. The platform 8 has two lugs 8b which slide along inclined cam faces 14a of the claws 14 while the platform moves from the position A' to the position B'. This causes the claws 14 to move into the housing of the motion picture projector. At the same time, the lugs 8b move relative to the cam faces 15a of the claws 15 to such positions that the hooked end portions of the claws 15 can extend forwardly beyond the slots 1c of the wall 1 and snap into the recesses B7 of the casing B1.

The aforementioned friction wheel 24 of the drive means for the reel B8 is mounted on an arm 25 which is pivotable on a stationary shaft 26 in the housing of the motion picture projector. The drawing shows the friction wheel 24 in its idle or retracted position. The arm 25 has a follower 25a which is received in a slot 8c of the platform 8. When the platform moves from the position A' to the position B', its slot 8c causes the follower 25a to pivot the arm 25 in a clockwise direction, as viewed in the drawing, so that the friction wheel 24 moves toward and into the window B5 in the side wall B4 of the casing B1. The platform 8 has a cutout 27 through which the friction wheel 24 can pass on its way toward the window B5.

It will be seen that, once the magazine A is removed from its operative position in a direction counter to that indicated by the arrow X, and the displacing lever 3 is pivoted to move the spindle 2 to the position B'', the magazine B can be moved to the operative position.

The movement of the spindle 2 along the path Y causes the teeth 11 to penetrate into the sockets B6 and the claws 15 to penetrate into the recesses B7 of the casing B1. The magazine B is then properly located and held in its operative position, and the friction wheel 24 can engage one or both flanges of the reel B8 or the outermost convolution of motion picture film between such flanges. When the presentation of images on the film which is stored in the casing B1 is completed, the movement of the friction wheel 24 into the window B5 is completed so that this friction wheel can actually engage the reel B8 or the film thereon and rotates the reel in a direction to collect the film. The means for moving the friction wheel 24 all the way into the window B5 and for starting the motor which rotates the friction wheel 24 in a direction to cause the reel B8 to collect the film thereon are of conventional design and are not shown in the drawing.

The spindle 2 is preferably movable to at least one intermediate position, such as the position A''' between the position A2'' and B2''. When the spindle dwells in the position A''', it can penetrate into the aperture A5a in the reel A5 of a magazine which is similar to but larger than the magazine A. However, the platform 8 can remain in the position A' regardless of whether it must support the narrow bottom wall A3 of the illustrated casing A1 or a larger casing. It is necessary to insure that, when the spindle 2 dwells in the intermediate position A''', it should be in accurate alignment with the aperture A5a of a larger casing A1.

An important advantage of the improved motion picture projector is that the manipulation of a single element, namely, the displacing lever 3, suffices to move the spindle 2 to the desired position as well as to move all movable elements of the engaging means on the projector to positions in which such engaging elements are either retracted or in engaging positions to cooperate with the complementary engaging elements on the selected magazine. Furthermore, if the spindle 2 is left in the position A'', the operator cannot move the magazine B to its operative position. Thus, the operator knows that, in order to properly attach the magazine B, he must manipulate the displacing lever 3 so as to move the spindle 2 out of the position in which it extends into the region of coincidence between the operative positions of the magazines A and B.

It is further clear that the improved projector is susceptible of many additional modifications without departing from the spirit of the present invention. For example, the various engaging elements can be replaced by other types of engaging elements. Also, the positions of the engaging elements on the projector and the engaging elements on the magazines can be reversed. However, it was found that the arrangement which is shown in the drawing is particularly advantageous because the movable engaging elements can be displaced simultaneously with the spindle 2 and platform 8 as well as with the drive means for the reels A5 and B8.

The term "uncentered or floating reel" is intended to denote a reel which is to be driven by a spindle inserted through a centrally located hole of the reel. The term "centered reel" is intended to denote a reel which is normally driven by a friction wheel or the like which can move into engagement with the reel through an opening in a wall of the magazine.

Without further analysis, the foregoing will so fully reveal the gist of the present invention that others can, be applying current knowledge, readily adapt it for various applications without omitting features which fairly constitute essential characteristics of the the generic and specific aspects of our contribution to the and, therefore, such adaptations should and are intended to be comprehended within the meaning and range of equivalence of the claims.

What is claimed as new and desired to be protected by Letters Patent is set forth in the appended claims:

1. In a cinematographic apparatus for use with at least one first type of film magazines with uncentered reels and at least one second type of film magazines with centered reels, particularly in a motion picture projector, a combination comprising a housing; a rotary spindle movable to at least one first position in which it centers the reel of a magazine of said first type when such magazine is maintained in a first predetermined operative position relative to said housing, said spindle being further movable to at least one second position in which it allows the placing of a magazine of said second type to a second predetermined operative position relative to said housing; and first and second engaging means, at least a portion of each of said first and second engaging means being respectively movable to and from an engaging position in response to movement of said spindle to said first and second position, each magazine of said first type having first complementary engaging means cooperating with said first engaging means in the operative position of such magazine and in the first position of said spindle to locate and/or hold the magazine in said first operative position, each magazine of said second type having second complementary engaging means cooperating with said second engaging means in the operative position of such magazine and in the second position of said spindle to locate and/or hold the magazine in said second operative position.

2. A combination as defined in claim 1, further comprising displacing means supported by said housing, said displacing means being movable with reference to said housing to thereby move said spindle between said first and second positions, the operative position of a magazine of said first type at least partially coinciding with the operative position of a magazine of said second type and said spindle being located without the region of such coincidence between said first and second operative positions in the second position of said spindle.

3. A combination as defined in claim 1, further comprising drive means supported by said housing and movable to and from a driving position in which said drive means can rotate the reel of at least one of said magazine types in the operative position of such one magazine, and means for moving said drive means to said driving position in response to movement of said spindle to that position in which said spindle permits the placing of the magazine of said one type to said operative position thereof.

4. A combination as defined in claim 1, further comprising displacing means mounted in said housing, said displacing means being movable relative to said housing to thereby effect movements of said spindle to said first and second positions and to respectively effect movements of said portions of said first and second engaging means to and from said engaging positions thereof.

5. A combination as defined in claim 1, wherein said first engaging means and said first complementary engaging means, as well as said second engaging means and said second complementary engaging means comprise male and female portions with said male portions extending into the female portions in the operative positions of the respective magazines.

6. A combination as defined in claim 1, wherein said first and second engaging means comprise a common magazine engaging member which respectively dwells in a first and a second position in the first and second positions of said spindle.

7. A combination as defined in claim 6, wherein said common engaging member is a platform which supports a magazine of said first type in said first position, and a magazine of said second type in said second position thereof.

8. A combination as defined in claim 7, wherein each magazine of said first and second type comprises a reel-confining casing having a narrow side face which is supported by said platform in the respective position of said platform and in the operative position of the respective magazine.

9. A combination as defined in claim 6, wherein said common engaging member is provided with at least one opening and said second engaging means comprising a projection which extends through such opening in the engaging position of said second engaging means, said second complementary engaging means comprising socket means receiving said projection when a magazine of said second type dwells in the operative position thereof.

10. A combination as defined in claim 1, wherein said first and second engaging means comprises claws and said first and second complementary engaging means comprise recesses for such claws.

11. A combination as defined in claim 1, further comprising means for rotating said spindle in a direction to collect the film on the reel in a magazine of said first type while such magazine dwells in said operative position thereof.

12. A combination as defined in claim 1, further comprising drive means for rotating the reel of a magazine of said second type in the operative position of such magazine, said drive means comprising a friction wheel and each magazine of said second type having a reel-confining casing provided with a window through which said friction wheel is movable into driving engagement with the reel of a magazine of said second type in the operative position of such magazine, said friction wheel being arranged to rotate the reel which is driven thereby in a direction to collect the film.

13. A combination as defined in claim 12, further comprising means for moving said friction wheel toward driving engagement with the reel of a magazine of said second type in response to movement of said spindle to said second position thereof.

* * * * *